United States Patent
Jeong et al.

(10) Patent No.: US 6,811,746 B2
(45) Date of Patent: Nov. 2, 2004

(54) ZIRCONIUM ALLOY HAVING EXCELLENT CORROSION RESISTANCE AND MECHANICAL PROPERTIES FOR NUCLEAR FUEL CLADDING TUBE

(75) Inventors: Yong Hwan Jeong, Taejon-si (KR); Jong Hyuk Baek, Taejon-si (KR); Byoung Kwon Choi, Taejon-si (KR); Myung Ho Lee, Taejon-si (KR); Sang Yoon Park, Taejon-si (KR); Cheol Nam, Taejon-si (KR); Youn Ho Jung, Taejon-si (KR)

(73) Assignees: Korea Atomic Energy Research Institute, Taejon-si (KR); Korea Hydro & Nuclear Power Co., Ltd., Seoul (KR)

( * ) Notice: Subject to any disclaimer, the term of this patent is extended or adjusted under 35 U.S.C. 154(b) by 191 days.

(21) Appl. No.: 10/040,743

(22) Filed: Nov. 1, 2001

(65) Prior Publication Data

US 2003/0044306 A1 Mar. 6, 2003

(30) Foreign Application Priority Data

May 7, 2001 (KR) .................................... 2001-24582

(51) Int. Cl.[7] ........................................... C22C 16/00
(52) U.S. Cl. ................... 420/422; 420/423; 148/672; 376/260; 376/261; 376/409; 376/410; 376/457
(58) Field of Search ................... 420/422, 423; 376/260, 261, 409, 457, 410; 148/672

(56) References Cited

U.S. PATENT DOCUMENTS

| | | | | |
|---|---|---|---|---|
| 4,108,687 A | * | 8/1978 | Armand et al. | 148/557 |
| 4,610,842 A | * | 9/1986 | Vannesjo | 376/416 |
| 4,648,912 A | * | 3/1987 | Sabol et al. | 148/565 |
| 4,649,023 A | * | 3/1987 | Sabol et al. | 420/422 |
| 4,664,881 A | * | 5/1987 | Ferrari et al. | 376/410 |
| 4,689,091 A | * | 8/1987 | Yoshida et al. | 148/672 |
| 4,717,428 A | * | 1/1988 | Comstock et al. | 148/501 |
| 4,986,957 A | * | 1/1991 | Taylor | 376/417 |
| 5,073,336 A | * | 12/1991 | Taylor | 376/457 |
| 5,076,488 A | * | 12/1991 | Graham | 148/519 |
| 5,122,334 A | * | 6/1992 | Bradley | 376/457 |
| 5,223,211 A | * | 6/1993 | Inagaki et al. | 376/462 |
| 5,230,758 A | * | 7/1993 | Foster et al. | 148/672 |
| 5,254,308 A | * | 10/1993 | Garde et al. | 420/422 |
| 5,334,345 A | * | 8/1994 | Rudling | 420/422 |
| 5,366,690 A | * | 11/1994 | Garde | 420/422 |
| 5,539,791 A | * | 7/1996 | Garzarolli et al. | 376/417 |
| 5,560,790 A | * | 10/1996 | Nikulina et al. | 148/672 |
| 5,596,615 A | * | 1/1997 | Nakamura et al. | 376/438 |
| 5,620,536 A | * | 4/1997 | Dahlback | 148/519 |
| 5,838,753 A | * | 11/1998 | Van Swam et al. | 376/412 |
| 5,972,288 A | * | 10/1999 | Jeong et al. | 420/422 |
| 5,985,211 A | * | 11/1999 | Jeong et al. | 420/423 |
| 6,125,161 A | * | 9/2000 | Isobe et al. | 376/410 |
| 6,261,516 B1 | * | 7/2001 | Jeong et al. | 420/422 |
| 6,325,966 B1 | * | 12/2001 | Jeong et al. | 420/422 |
| 6,514,360 B2 | * | 2/2003 | Jeong et al. | 148/668 |

* cited by examiner

Primary Examiner—Michael J. Carone
(74) Attorney, Agent, or Firm—Bachman & LaPointe, P.C.

(57) ABSTRACT

The present invention relates to a zirconium alloy having excellent corrosion resistance and mechanical properties and a method for preparing a nuclear fuel cladding tube by zirconium alloy. More particularly, the present invention is directed to a zirconium alloy comprising Zr-aNb-bSn-cFe-dCr-eCu (a=0.05–0.4 wt %, b=0.3–0.7 wt %, c=0.1–0.4 wt %, d=0–0.2 wt % and e=0.01–0.2 wt %, provided that Nb+Sn=0.35–1.0 wt %), and to a method for preparing a zirconium alloy nuclear fuel cladding tube, comprising melting a metal mixture comprising of the zirconium and alloying elements to obtain ingot, forging the ingot at β phase range, β-quenching the forged ingot at 1015–1075° C., hot-working the quenched ingot at 600–650° C., cold-working the hot-worked ingot in three to five passes, with intermediate vacuum annealing and final vacuum annealing the worked ingot at 460–540° C., which can be applied to the core components in a light water and a heavy water atomic reactor type nuclear power plant.

4 Claims, 7 Drawing Sheets

ZIRCONIUM ALLOY HAVING EXCELLENT CORROSION RESISTANCE AND MECHANICAL PROPERTIES FOR NUCLEAR FUEL CLADDING TUBE

TECHNICAL FIELD

The present invention relates to a zirconium alloy having excellent corrosion resistance and mechanical properties and a method for preparing a nuclear fuel cladding tube by zirconium alloy. More particulary, the present invention is directed to a zirconium alloy comprising Zr-aNb-bSn-cFe-dCr-eCu (a=0.05–0.4 wt %, b=0.3–0.7 wt %, c=0.1–0.4 wt %, d=0–0.2 wt % and e=0.01–0.2 wt %, provided that Nb+Sn=0.35–1.0 wt %), and to a method for preparing a zirconium alloy nuclear fuel cladding tube, comprising melting a metal mixture comprising zirconium and alloying elements to obtain an ingot, forging the ingot at β phase range, β-quenching the forged ingot in water after a solution heat-treatment at 1015–1075° C., hot-working the quenched ingot at 600–650° C., cold-working the hot-worked ingot in three to five times with intermediate vacuum annealing, and final vacuum annealing the cold-worked ingot at 460–540° C.

BACKGROUND ART OF THE INVENTION

In the past, zirconium alloys have found widespread use in nuclear reactor applications, including nuclear fuel rod cladding, nuclear fuel assembly grids and reactor core components, of a pressurized water reactor (PWR) and a boiling water reactor (BWR). Of zirconium alloys developed up to now, zircaloy-2(Sn 1.20–1.70 wt %, Fe 0.07–0.20 wt %, Cr 0.05–1.15 wt %, Ni 0.03–0.08 wt %, O 900–1500 ppm, Zr the balance) and zircaloy-4 (Sn 1.20–1.70 wt %, Fe 0.18–0.24 wt %, Cr 0.07–1.13 wt %, O 900–1500 ppm, Ni<0.07 wt %, Zr the balance) including Sn, Fe, Cr and Ni have been widely utilized.

In recent years, to improve the operations of atomic reactors, such as by a reduction of cycling cost of nuclear fuel, nuclear fuels for high burnup are considered. In the case that conventional zircaloy-2 and zircaloy-4 are used as nuclear fuel cladding tube materials, many problems including corrosion and poor mechanical strength are caused. and Thus, there is a widely recognized need for development of materials usable as nuclear fuel cladding tubes for high burnup, which are advantageous in terms of excellent corrosion resistance and mechanical strength. Therefore, in the present invention, Sn negatively affecting corrosion resistance of the zirconium alloy is added in a smaller amount, and Nb is additionally added to the alloy, thereby developing a novel zirconium alloy nuclear fuel cladding tube for high burnup, capable of compensating for an increase of corrosion and a decrease of tensile and creep strengths. Corrosion resistance and mechanical properties of the zirconium alloy depend highly on kinds and amounts of the alloying elements. Also, all properties of final products are changed according to preparation process, so that the products should be prepared by optimal process.

For conventional Nb and Sn-containing zirconium alloys and methods for preparing nuclear fuel cladding tubes thereof, U.S. Pat. No. 6,125,161 refers to a method for preparing a zirconium alloy nuclear reactor fuel cladding, the alloy comprising Sn 0.2–0.7 wt %, Fe 0.18–0.6 wt %, Cr 0.07–0.4 wt %, Nb 0.05–1.0 wt %, N<60 ppm and Zr the balance, and Sn 0.2–0.7 wt %, Fe 0.18–0.6 wt %, Cr 0.07–0.4 wt %, Nb 0.05–1.0 wt %, Ta 0.01–0.1 wt %, N<60 ppm and Zr the balance. As for non-Ta added alloy, an accumulated annealing parameter (ΣA) is differently determined on a basis of 0.5 wt % of Nb. That is to say, when Nb content ranges from 0.05 to to 0.5 wt %, said parameter is limited to the range of $-20<\log \Sigma A_i<-15$ and $-18-10X_{Nb}<\log \Sigma A_i<-15-3.75(X_{Nb}-0.2)$. Meanwhile, when Nb exceeds 0.5 wt %, said parameter is limited to $-20<\log \Sigma A_i<-18-2(X_{Nb}-0.5)$.

U.S. Pat. No. 5,838,753 discloses a process for fabricating nuclear fuel rod cladding tube comprising a zirconium alloy, comprising β quenching a zirconium alloy billet consisting essentially of Nb 0.5–3.25 wt % and Sn 0.3–1.8 wt %, the balance of said alloy being essentially nuclear grade zirconium with incidental impurities, by heating to a temperature in β range above 950° C. and rapidly quenching the billet to a temperature below the α+β to α transformation temperature to form a martensitic structure; extruding the β-quenched billet at a temperature below 600° C. to form a hollow billet; annealing the extruded billet by heating at a temperature up to 590° C.; cold-working said annealed billet; and final annealing said pilgered annealed hollow billet to a temperature up to 590° C. As such, said nuclear fuel rod cladding tube comprises the alloy having a microstructure of β-Nb second phase precipitates uniformly distributed intragranularly and intergranularly forming radiation resistant second phase precipitates in the alloy matrix so as to result in increased resistance to aqueous corrosion compared to that of zircaloy when irradiated to high fluence. In addition, the β-quenching step is performed below 250° C. at a rate greater than about 300 K/sec. The second phase precipitates have a limited average size of 80 nm. Also, the alloy further comprising Si 150 ppm or less, C 50–200 ppm and O 400–1000 ppm has the second phase precipitates with a size of 60 nm.

EP 0 198 570 B1 refers to a process for fabricating thin-walled tubing with a thickness of 1 mm or less from a zirconium-niobium alloy containing Nb 1.0–2.5 wt % as homogeneously dispersed finely divided particles, and selected from the group consisting of Cu, Fe, Mo, Ni, W, V, and Cr as a third element, comprising β-quenching a zirconium-niobium alloy billet; extruding said β-quenched billet at a temperature no higher than 650° C. to form a tube shell; further deforming said tube shell by cold working the same in a plurality of cold working stages; annealing said tube shell, between each of said stages of cold working, at a temperature below 650° C.; and final annealing the resultant tubing at a temperature below 600° C., so as to produce a microstructure of the material having Nb particles of a size below 80 nm homogeneously dispersed therein. As for the alloy containing only Nb 1–2.5 wt %, annealing of the tube shell is performed at a temperature of from 500 to 600 ° C., and, preferably, at a temperature of about 524° C. for a period of about 7.5 hours. The final annealing is at a temperature below 500° C., and, preferably, at a temperature of about 427° C. for a period of about 4 hours. Following the extruding and prior to the further deforming, the tube shell is β-annealed by heating the same at a temperature in the range of 850–1050° C. and rapidly cooling the same.

U.S. Pat. No. 5,230,758 discloses that zirconium alloy comprising Nb 0.5–2.0 wt %, Sn 0.7–1.5 wt %, Fe 0.07–0.14 wt %, Cr 0.025–0.08 wt %, Cr-Ni 321 ppm or less, and 0.03–0.14 wt % of at least one of Cr and Ni, and at least 0.12 wt % total of Fe+Cr+Ni, and C 220 ppm or less, and the Zr the balance, is subjected to a post extrusion annealing and a series of fabrication step. Intermediate annealing temperature is 645–704° C. and the alloy is subjected to β annealing two steps prior to a final sizing.

As mentioned in the above prior arts, research has been carried out on conventional zirconium alloy comprising Nb and Sn for preparing a zirconium alloy nuclear fuel cladding tube for high burnup, with excellent corrosion resistance and improved strength by changing kinds and amounts of the elements to be added, or by adjusting conditions of working and annealing.

SUMMARY OF THE INVENTION

Leading to the present invention, the intensive and thorough research for a zirconium alloy having excellent corrosion resistance and mechanical properties, carried out by the present inventors aiming to avoid the problems encountered in the prior arts, resulted in the finding that Nb+Sn is added in an amount of 0.35–1.0 wt % to a zirconium alloy and then Fe, Cu and Cr are added thereto, whereby corrosion resistance and mechanical properties can be improved.

Accordingly, it is an object of the present invention to provide a zirconium alloy having excellent corrosion resistance and mechanical properties.

It is another object of the present invention to provide a method for preparing a nuclear fuel cladding tube by the zirconium alloy, which can be effectively applied to the core components in atomic reactors.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

To carry out above object, the present invention provids a zirconium alloy comprising Nb 0.05–0.40 wt %, Sn 0.3–0.7 wt %, Fe 0.1–0.4 wt %, Cu 0.01–0.2 wt %, Si 80–120 ppm, O 600–1400 ppm and Zr the balance.

And the present invention provids a method for preparing a nuclear fuel cladding tube by the zirconium alloy comprising the steps of:

Melting a metal mixture of the zirconium alloy to form ingot (step 1); forging said ingot in β range (step 2); β-quenching at 1015–1075° C. (step 3); hot-working at 600–650° C. (step 4); repeated cycles of cold-working 3–5 times and intermediate vacuum annealing between the cold-workings at 550–640° C. (step 5); and final annealing at 460–540° C. (step 6).

Hereinafter, a detailed description will be given of the present invention.

I. Zirconium Alloy

In the present invention, zirconium alloys having the compositions shown in Table 1 are prepared and then melted to form an ingot of the alloy. Experimental alloy 1 designates a standard alloy; Experimental alloy 2–6, very small amounts of Nb-containing alloys; Experimental alloy 7–10, various amounts of Sn-containing alloys; Experimental alloy 11–13, very small amounts of Fe-containing alloys; Experimental alloy 14–16, very small amounts of Cu-containing alloys; and Experimental alloy 17–20, additional Cr-containing alloys. In particular, a very small amount of Cr is added to investigate its effect on alloy properties.

TABLE 1

| Experimental Alloy | Nb (wt %) | Sn (wt %) | Fe (wt %) | Cr (wt %) | Cu (wt %) | Si (ppm) | O (ppm) | Zr |
|---|---|---|---|---|---|---|---|---|
| 1 | 0.19 | 0.49 | 0.20 | — | 0.09 | 78 | 1040 | balance |
| 2 | 0.06 | 0.48 | 0.22 | — | 0.11 | 99 | 1205 | balance |
| 3 | 0.11 | 0.52 | 0.25 | — | 0.12 | 80 | 998 | balance |
| 4 | 0.15 | 0.51 | 0.18 | — | 0.07 | 110 | 1156 | balance |
| 5 | 0.26 | 0.54 | 0.21 | — | 0.10 | 102 | 980 | balance |
| 6 | 0.38 | 0.50 | 0.24 | — | 0.11 | 95 | 1245 | balance |
| 7 | 0.21 | 0.32 | 0.22 | — | 0.09 | 104 | 790 | balance |
| 8 | 0.19 | 0.43 | 0.21 | — | 0.08 | 108 | 899 | balance |
| 9 | 0.22 | 0.59 | 0.24 | — | 0.12 | 93 | 1017 | balance |
| 10 | 0.20 | 0.71 | 0.22 | — | 0.11 | 97 | 1317 | balance |
| 11 | 0.17 | 0.49 | 0.11 | — | 0.09 | 120 | 994 | balance |
| 12 | 0.19 | 0.46 | 0.29 | — | 0.07 | 111 | 958 | balance |
| 13 | 0.22 | 0.48 | 0.38 | — | 0.10 | 102 | 1199 | balance |
| 14 | 0.24 | 0.52 | 0.20 | — | 0.02 | 89 | 981 | balance |
| 15 | 0.22 | 0.50 | 0.21 | — | 0.05 | 92 | 876 | balance |
| 16 | 0.20 | 0.49 | 0.18 | — | 0.22 | 107 | 1089 | balance |
| 17 | 0.22 | 0.49 | 0.31 | 0.05 | 0.01 | 121 | 1202 | Balance |

TABLE 1-continued

| Experimental Alloy | Nb (wt %) | Sn (wt %) | Fe (wt %) | Cr (wt %) | Cu (wt %) | Si (ppm) | O (ppm) | Zr |
|---|---|---|---|---|---|---|---|---|
| 18 | 0.21 | 0.46 | 0.32 | 0.11 | 0.11 | 122 | 1187 | Balance |
| 19 | 0.19 | 0.47 | 0.30 | 0.16 | 0.08 | 100 | 1163 | Balance |
| 20 | 0.21 | 0.49 | 0.29 | 0.21 | 0.10 | 94 | 1249 | Balance |
| Zircaloy-4 | — | 1.38 | 0.2 | 0.1 | — | — | 1400 | Balance |

Sn is an important element in light of an improvement in the strength of the alloy, when Sn is added in too much amounts, corrosion resistance of the alloy significantly decreases. Hence, Sn content is set to 0.3–0.7 wt %, thereby improving corrosion resistance without drastically decreasing the strength of the alloy.

Nb component improves tensile strength and creep strength, and has excellent effect of increasing corrosion resistance and hydriding resistance, by generating precipitates in the alloy. In the present invention, Nb content is set to 0.05–0.4 wt %. Said component compensates for a decrease of the strength attributed to reduction of Sn content, and improves corrosion resistance under LiOH atmosphere, and decreases hydriding ratio. By limiting the total amount of Sn+Nb to be added to 1 wt % or lower, very excellent corrosion resistance can be obtained.

Fe, Cr and Cu largely contribute to an improvement of corrosion resistance caused by formation of precipitates and are responsible for increasing creep strength, so that these components must be added in very small amounts. In the present invention, Fe content is set to 0.1–0.4 wt %, Cr content to 0.05–0.2 wt % and Cu content to 0.01–0.2 wt %, thereby significantly increasing corrosion resistance. If the amounts of Fe, Cr and Cu are less than each lower limit, the effect of the added elements is very low. Meanwhile, if the amounts exceed each upper limit, corrosion resistance is rather poor and workability becomes drastically decreased.

Si component is responsible for slowing transition points of corrosion rates and for reducing hydriding ratio. In the present invention, Si content is set to 80–120 ppm to achieve the most superior effect.

Oxygen is added to improve tensile and creep strengths. If an amount of oxygen to be added is less than 600 ppm, the effect is not exerted. On the other hand, when the amount exceeds 1400 ppm, problems of workability are caused. Thus, in the present invention, oxygen content to be added is set to 600–1400 ppm.

In the present invention, It is preferred that the Nb-containing zirconium alloy comprises Nb 0.05–0.40 wt %, Sn 0.3–0.7 wt %, Fe 0.1–0.4 wt %, Cu 0.01–0.20 wt %, Si 80–120 ppm, O 600–1400 ppm and Zr the balance. As such, the amount of Nb+Sn is 0.35–1.0 wt %.

And, it is preferred that the zirconium alloy comprises Nb 0.05–0.40 wt %, Sn 0.3–0.7 wt %, Fe 0.1–0.4 wt %, Cr 0.05–0.20 wt %, Cu 0.01–0.20 wt %, Si 80–120 ppm, O 600–1400 ppm and Zr the balance. As such, the amount of Nb+Sn is 0.35–1.0 wt %.

More preferably, zirconium alloy suitable for nuclear fuel cladding tubes is composed of Nb 0.2 wt %, Sn 0.5 wt %, Fe 0.2 wt %, Cu 0.1 wt %, Si 100 ppm, O 1200 ppm and Zr the balance, or Nb 0.2 wt %, Sn 0.5 wt %, Fe 0.3 wt %, Cr 0.15 wt %, Cu 0.1 wt %, Si 100 ppm, O 1200 ppm and Zr the balance.

II. A Method For Preparing Zirconium Alloy Nuclear Fuel Caldding Tube

In the present invention, the method for preparing a nuclear cladding tube by the zirconium alloy comprises the steps of:

melting a metal mixture comprising of zirconium and alloying elements to obtain a ingot (step 1);

forging the ingot at P phase range (step 2);

β-quenching the forged ingot after performing a solution heat-treatment at 1015–1075° C. (step 3);

hot-working the quenched billet at 600–650° C. (step 4);

cold-working the got-worked ingot in three to five times, with intermediate vacuum annealing at 550–640° C. (step 5); and final vacuum annealing the cold-worked billet at 460–540° C. (step 6).

In the step 1, alloy elements, including Nb, Sn, Fe, Cr, Cu, Si and O, are mixed and then melted, thus ingots of zirconium alloy is prepared.

In the step 2, the ingot is forged at β phase range of 1000–1200° C. to break its dentrite structures.

In the step 3, solution heat treatment of the ingot is performed at β range of 1015–1075° C. and then a rapid cooling are carried out, thus yielding a martensitic structure or a widmanstattenic structure to obtain uniform alloy compositions by β-quenching. Such β-quenching is performed to obtain uniform precipitate distribution (i.e., inter-particle spacing) and to control the precipitate size.

In the step 4, the β-quenched ingot is worked into intermediate products of a hollow billet and hot worked to prepare an extruded shell, which is suitable for cold working. At that time, the heat treatment temperature is preferably 600–650° C., more preferably 630° C.

In the step 5, the extruded shell prepared in the fourth step is cold-worked to prepare a TREX (tube reduced extrusion), which is then heat-treated in the intermediate vacuum annealing step. Such TREX is further cold worked 2–4 times. Through the total 3–5 times of cold working and the intermediate vacuum annealing between the cold working steps. It is preferred that intermediate vacuum annealing is carried out at 550–650° C. for 2–3 hours under vacuum.

In the step 6, final vacuum annealing is conducted to greatly improve corrosion resistance and mechanical performance of the nuclear fuel cladding tube. Therefore, the alloy of the present invention is subjected to final vacuum annealing at 460–540° C., and preferably, at 470–520° C. for 2.5 hours, thereby obtaining excellent corrosion resistance and mechanical properties.

Having generally described this invention, a further understanding can be obtained by reference to certain specific examples which are provided herein for purposes of illustration only and are not intended to be limiting unless otherwise specified.

EXAMPLE

Example 1

Preparation of Zirconium Alloy Nuclear Fuel Cladding Tube

To confirm an effect of very small amounts of elements to be added to a zirconium alloy, a mixture comprising Zr-aNbbSn-cFe-dCr-eCu (a=0.05–0.4 wt %, b=0.3–0.7 wt %, c=0.1–0.4 wt %, d=0–0.2 wt %, e=0.01–0.2 wt %, provided that, a+b=0.35–1.0 wt %), as shown in the above table 1, was melted in a vacuum arc melting furnace to obtain the ingot of the alloy. Forging was carried out at β phase range of 1200° C. to break its dentrite structure in the ingot. Subsequently, through β-quenching process in which solution heat treatment was performed at 1050° C. to uniformly distribute alloy elements and then a rapid cooling was performed, thereby yielding a martensitic or a widmanstattenic structure. The β-quenched ingot was worked to hot working at 630° C. to make an extruded shell suitable for cold working. The extruded shell prepated in the fourth step is cold-working to obtain a TREX. Subsequently, a vacuum annealing was carried out at 580–640° C. As such, the period of time required for the annealing was 0.5–3 hours. The vacuum annealed TREX was subjected to cold-working 2–4 times to prepare a nuclear fuel cladding tube having an outer diameter of 95 mm with a thickness of 0.57 mm. Every intermediate vacuum annealing between cold-working steps was performed at 570–610° C. for 2–3 hours, and final vacuum annealing was conducted at 460–540° C. for 2–3 hours to prepare a nuclear fuel cladding tube of the zirconium alloy.

Experimental Example 1

Observation of Microstructure According to Each Preparation Step

Figure 1A:
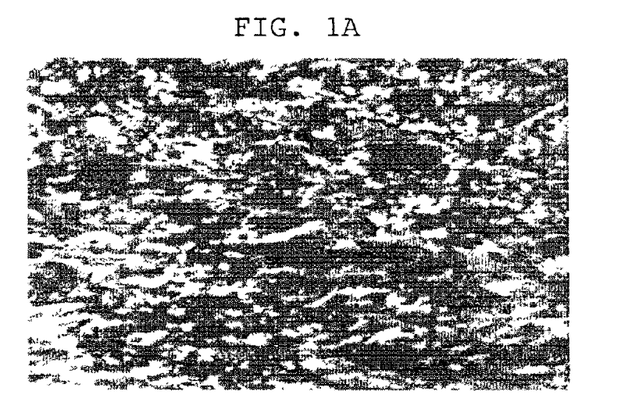
FIG. 1a is a photomicrograph of microstructures after an experimental alloy 1 is subjected to a first intermediate vacuum annealing.
Figure 1B:
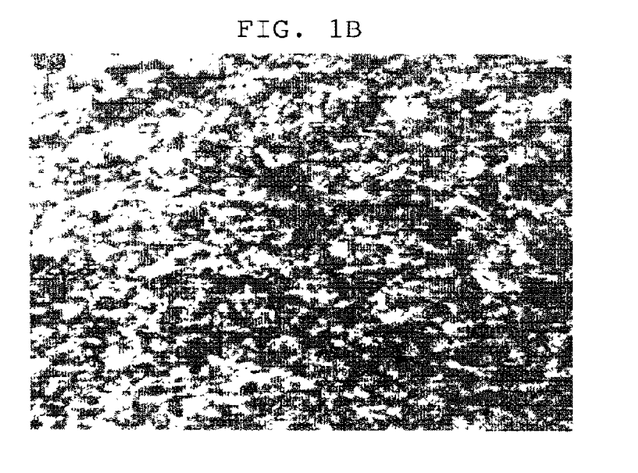
FIG. 1b is a photomicrograph of microstructures after an experimental alloy 1 is subjected to a second intermediate vacuum annealing.
Figure 1C:
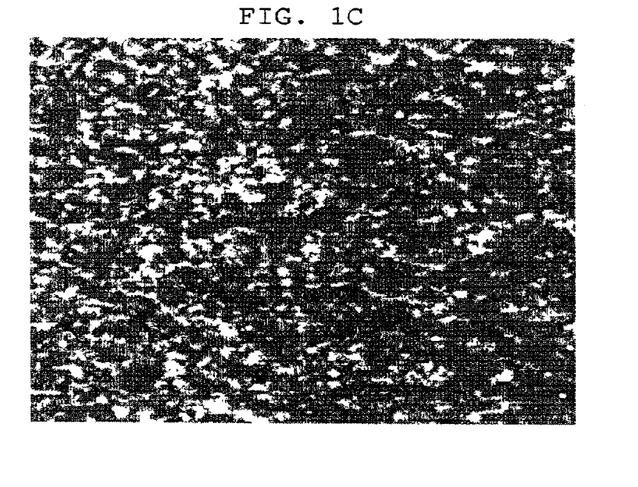
FIG. 1c is a photomicrograph of microstructures after an experimental alloy 1 is subjected to a third intermediate vacuum annealing.

Referring to FIGS. 1a to 1c, there are shown photomicrographs of microstructures according to each preparation step of an experimental alloy 1 (standard alloy). A test piece for observing microstructures was abraded by #2000 SiC abrasive paper, and etched with HF (10 wt %)+HNO$_3$ (45 wt %)+H$_2$O (45 wt %)

In observing microstructures by use of a polarization microscope, the wholly recrystallized structure being distorted in some parts according to a working direction was seen when the first intermediate vacuum annealing was performed at 590° C. for 3 hours. Then, recrystallization was totally completed by a second and a third intermediate vacuum annealing carried out at 570° C. for 2 hours. As for the elongation of crystallization granules according to working treatment, it is performed in the microstructure after the first intermediate vacuum annealing and, to lesser extent, after the second and the third annealing. When a temperature range of intermediate vacuum annealing for the alloys mentioned in the example was set to 550–640° C., excellent corrosion resistance and mechanical properties were obtained. In particular, the intermediate vacuum annealing at 560–590° C. resulted in very superior corrosion resistance and mechanical properties.

Experimental Example 2

Observation of Final Microstructure

After the experimental alloy 1 (standard alloy) was subjected to last cold-working, final vacuum annealing was conducted at a temperature range of from 470° C. for stress relief annealing to 520° C. for partial recrystallization, for 2.5 hours to prepare the test pieces in the same manner as in the above experimental example 1, which were then observed for their microstructures.

Figure 2A:
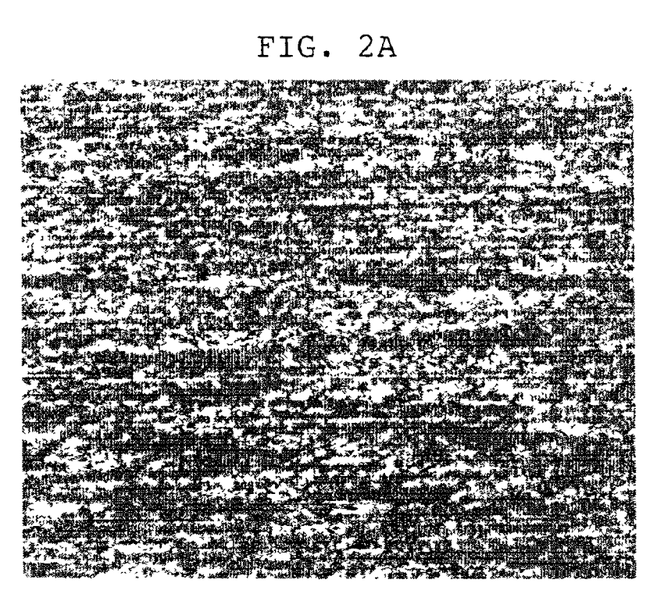
FIG. 2a is a photomicrograph of microstructures after an experimental alloy 1 is subjected to stress relief annealing.
Figure 2B:
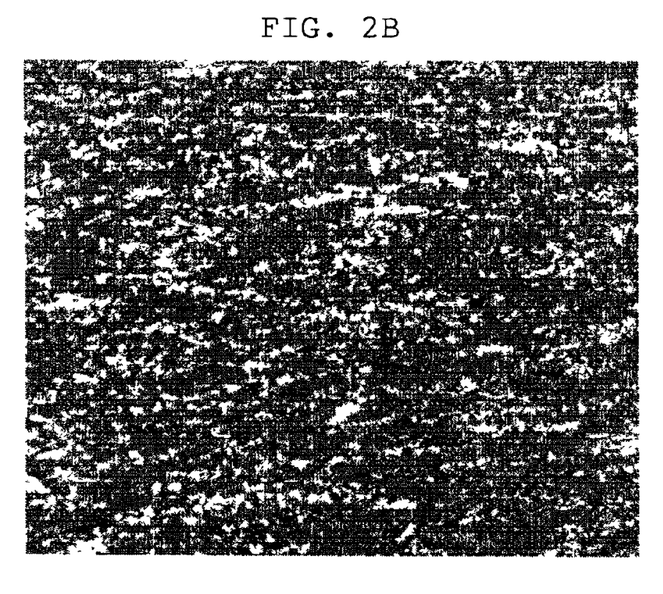
FIG. 2b is a photomicrograph of microstructures after an experimental alloy 1 is subjected to partial recrystallization annealing.

FIGS. 2a and 2b show microstructures of the pieces after stress relief annealing and partial recrystallization, which illustrate all intended structure types. When final vacuum annealing was performed at this temperature range (470–520° C.), very preferable corrosion resistance and mechanical properties were obtained.

Experimental Example 3

Corrosion Test

To investigate corrosion resistance of the experimental alloys 1–20 in the above example, a corrosion test was carried out under three conditions of water at 360° C. (18.9 MPa), steam atmosphere at 400° C. (10.3 MPa) and 70 ppm aqueous LiOH solution at 360° C., for 450 days. Tube and sheet materials were processed to corrosion test pieces, abraded by #1200 SiC abrasive paper to give the same surface condition, ultrasonically cleaned, and washed with the acid mixture of HF (5 wt %)+HNO$_3$ (45 wt %)+H$_2$O (50 wt %). The test pieces were periodically taken out from an autoclave and a weight gain caused by corrosion was measured, thus assaying corrosion resistance.

Figure 3:
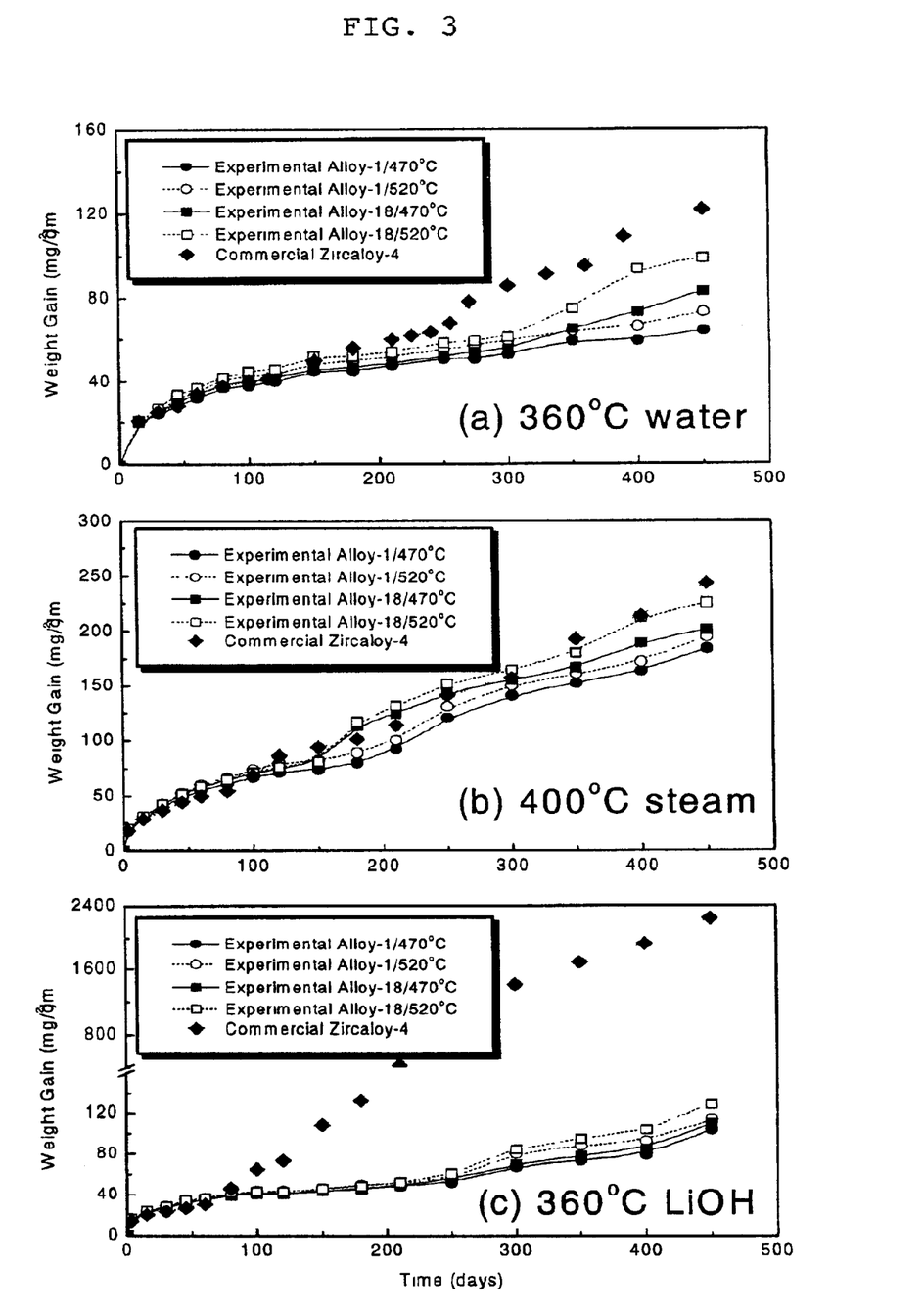
FIG. 3 is a graph illustrating corrosion behavior of experimental alloys 1 and 18.

As seen in FIG. 3, for experimental alloys 1 and 18 and commercial zircaloy-4, corrosion results according to the period of time under each corrosion test condition are presented. Comparing to commercial zircaloy-4, experimental alloys 1 and 18 had very excellent corrosion resistance. In particular, under 70 ppm LiOH, corrosion resistance of the present alloys was more excellent than that of commercial zircaloy-4. The test pieces subjected to final vacuum annealing at 460–540° C. were superior in corrosion resistance. In addition, after corrosion testing for 450 days, a hydriding ratio of the present alloy reduced by about ⅓ compared to that of commercial zircaloy-4, was found to be 7–10%.

Figure 4:
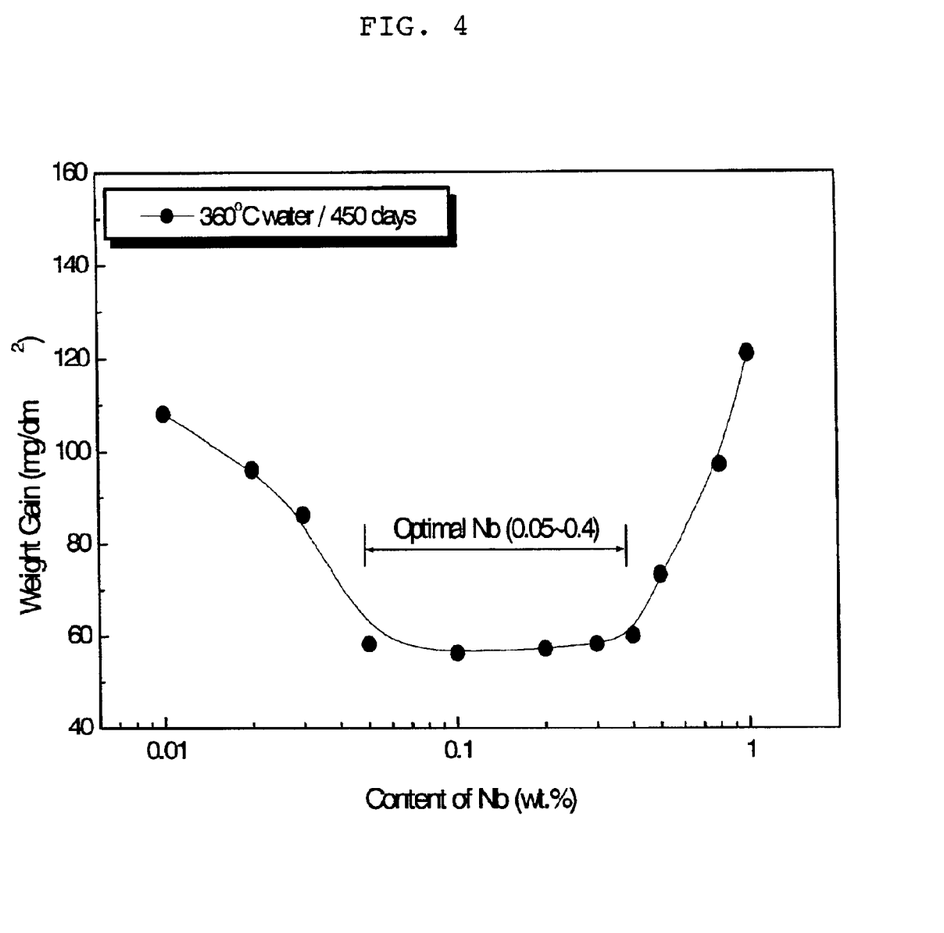
FIG. 4 is a graph illustrating corrosion properties according to change of Nb contents.

In FIG. 4, there is shown the results of corrosion testing in 360° C. water for 450 days according to contents of Nb, a main alloy element. As for Zr-aNb-0.5Sn-0.2Fe-0.1Cu-0.01Si-0.12O alloy, Nb content for obtaining the lowest weight gain was in the range of 0.05 to 0.4 wt %. Meanwhile, the weight gain was rather increased for Nb content beyond said range. So, addition of Nb in the range of 0.05–0.4 wt % resulted in the most excellent corrosion resistance.

Figure 5:
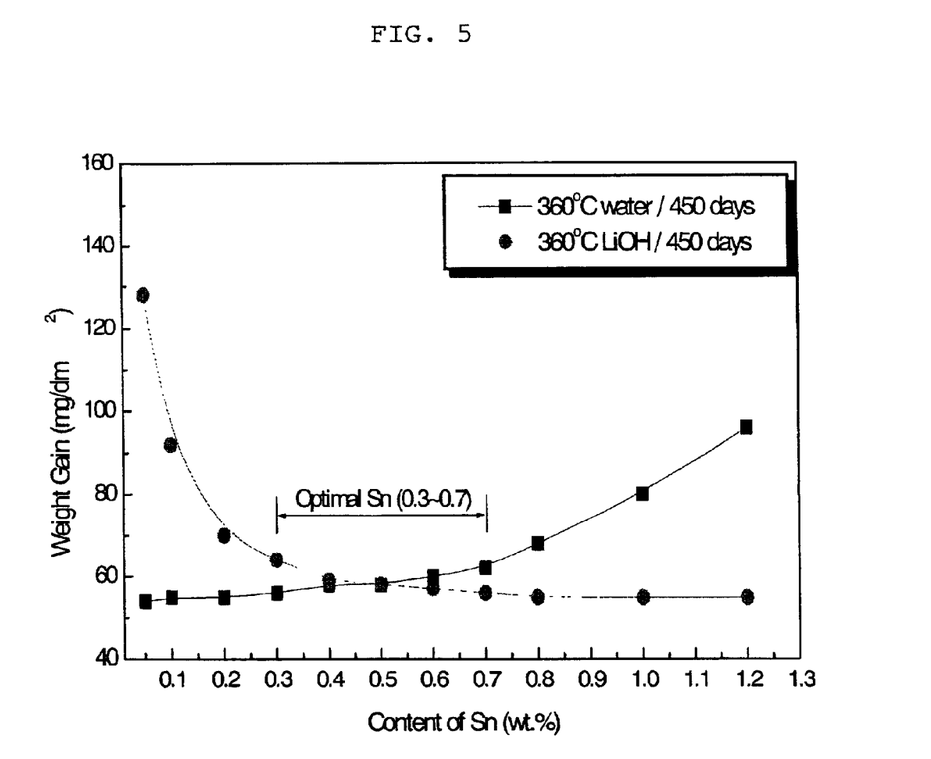
FIG. 5 is a graph illustrating corrosion properties according to change of Sn contents.

FIG. 5 shows contrary results of corrosion tests under the conditions of 360° C. water and 70 ppm LiOH for 450 days according to contents of Sn, in Zr-0.2Nb-bSn-0.2Fe-0.1Cu-0.01Si-0.12O alloy. In the case of 360° C. water, an increase of Sn contents resulted in a decrease of corrosion resistance. Meanwhile, in the case of 360° C. LiOH, corrosion resistance was increased according to an increase of Sn contents. From the result of this graph, it can be seen that excellent corrosion resistance is achieved, when Sn is added in the amount of 0.7 wt % or lower under water atmosphere and also when Sn is added in the amount of at least 0.3 wt % under LiOH corrosion atmosphere. Hence, in order to have excellent corrosion resistance under two-corrosion test conditions for Zr-0.2Nb-bSn-0.2Fe-0.1Cu-0.01Si-0.12O alloy, Sn contents were limited to 0.3–0.7 wt %.

Figure 6:
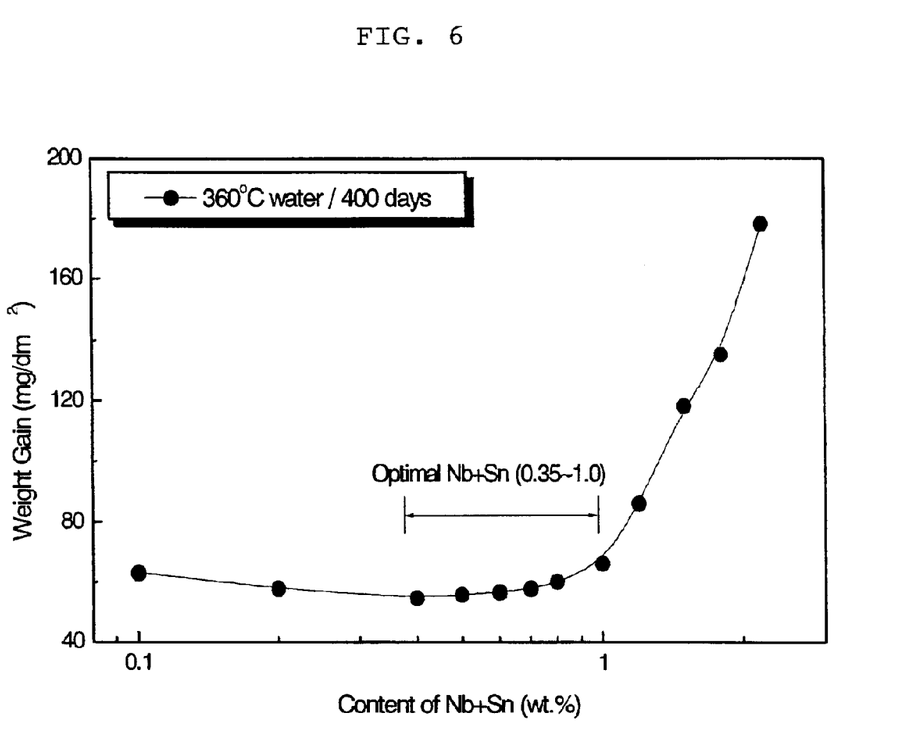
FIG. 6 is a graph illustrating corrosion properties according to change of Nb+Sn contents.

With reference to FIG. 6, the effect of added Nb+Sn contents on corrosion resistance is shown. When the combined weights of two alloy elements were 1.0 wt % or lower, the alloy had superior corrosion resistance. To have excellent corrosion resistance for Zr-aNb-bSn-0.2Fe-0.1Cu-0.01Si-0.12O alloy, it is preferred that Nb should be added in the amount of 0.05–0.4 wt %, Sn in the amount of 0.3–0.7 wt %, and Nb+Sn in the amount of 0.35–1.0 wt %. In particular, when Nb content is 0.2 wt % and Sn content is 0.5 wt %, corrosion resistance of the present alloy is increased at least twice to that of commercial zircaloy-4, under 360° C. water.

Figure 7:
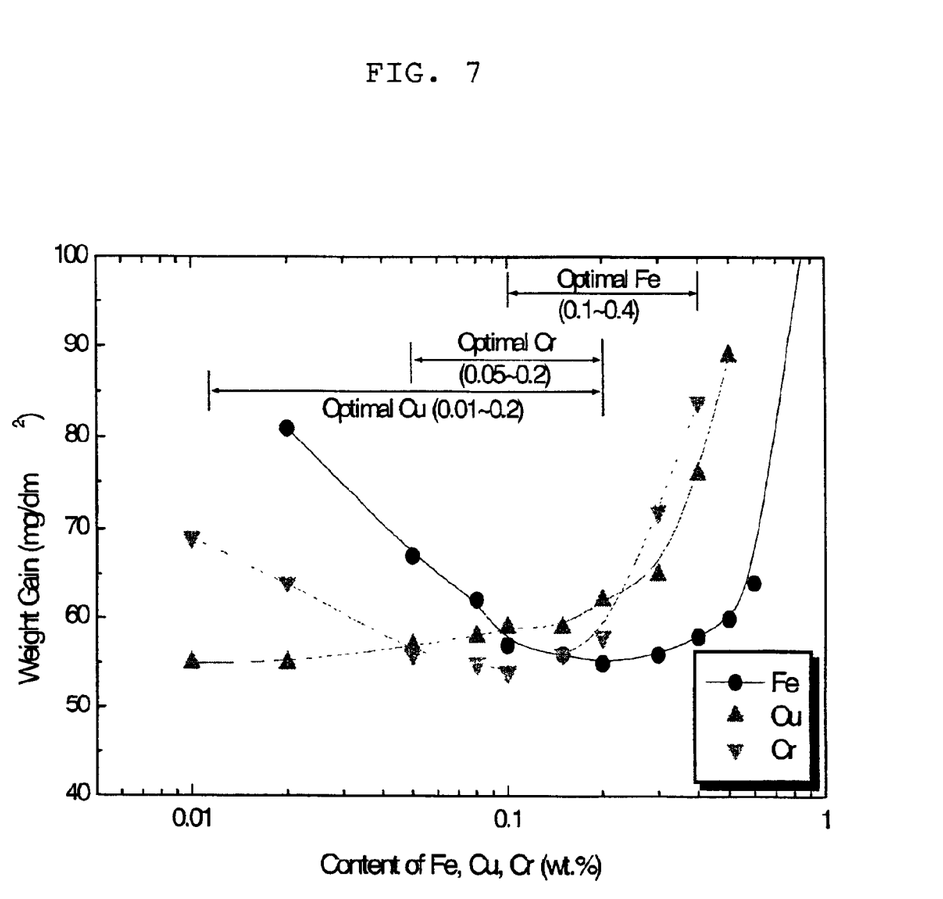
FIG. 7 is a graph illustrating corrosion properties according to change of Fe, Cu and Cr contents.

Turning now to FIG. 7, there are shown the results of corrosion properties when Fe, Cu and Cr are added in very small amounts. Addition of Fe 0.1–0.4 wt %, Cu 0.01–0.2 wt % and Cr 0.05–0.2 wt % results in excellent corrosion resistance. By limiting the combined amounts of Fe, Cu and Cr up to 0.8 wt %, corrosion resistance can be improved.

Experimental Example 4

Tensile Test

To investigate tensile strength of experimental alloys prepared in the above example, tensile test was performed at room temperature according to ASTM-E8 standard by a universal testing machine of 10 tons. All test pieces prepared at different temperatures of intermediate vacuum annealing between cold working steps, and final vacuum annealing, were measured for their tensile properties. As a comparative example, commercial zircaloy-4 was used.

Table 2, below, shows tensile strength according to final annealing temperatures. The present alloys had more excellent tensile properties than those of commercial zircaloy-4.

TABLE 2

| Experimental Alloy | Tensile Strength of Zirconium Alloy at Room Temp. | | | |
|---|---|---|---|---|
| Final Annealing | Yield Strength (MPa) | | Tensile Strength (MPa) | |
| | 470° C. | 520° C. | 470° C. | 520° C. |
| 1 | 558 | 536 | 703 | 654 |
| 2 | 543 | 531 | 696 | 647 |
| 3 | 549 | 537 | 697 | 648 |
| 4 | 554 | 542 | 701 | 648 |
| 5 | 552 | 540 | 710 | 655 |
| 6 | 550 | 539 | 709 | 656 |
| 7 | 553 | 528 | 698 | 648 |
| 8 | 548 | 534 | 701 | 653 |
| 9 | 556 | 539 | 705 | 659 |
| 10 | 565 | 544 | 713 | 663 |
| 11 | 558 | 531 | 700 | 651 |
| 12 | 559 | 537 | 702 | 658 |
| 13 | 561 | 540 | 705 | 662 |
| 14 | 557 | 537 | 702 | 657 |
| 15 | 561 | 542 | 708 | 661 |
| 16 | 558 | 539 | 709 | 659 |
| 17 | 569 | 549 | 712 | 662 |
| 18 | 572 | 548 | 713 | 661 |
| 19 | 570 | 553 | 719 | 668 |
| 20 | 576 | 559 | 722 | 690 |
| Zircaloy-4 | 506 | 465 | 682 | 626 |

Experimental Example 5

Creep Test

To investigate creep rates of the experimental alloys, each test piece from the alloys is pressurized internally and maintained at 400° C. for 240 hours under a stress of 150 MPa. The test result of the alloys was compared with that of commercial zircaloy-4. Normal creep rate was used as a analytical parameter of creep resistance because it shows creep properties of Nb-containing zirconium alloys of the above example.

As shown in the following Table 3, the present zirconium alloys are lower in creep rate than that of commercial zircaloy-4, so having excellent creep resistance.

TABLE 3

| Experimental Alloy | Creep Rate of Nb-containing Zirconium Alloy $\times 10^{-17}$ %/sec | |
|---|---|---|
| Final Annealing | 470° C. | 520° C. |
| 1 | 12.5 | 7.4 |
| 2 | 14.7 | 9.5 |
| 3 | 13.8 | 9.2 |
| 4 | 12.7 | 8.7 |
| 5 | 12.1 | 7.5 |
| 6 | 11.4 | 6.4 |
| 7 | 13.5 | 9.2 |
| 8 | 13.2 | 8.8 |
| 9 | 12.6 | 7.8 |
| 10 | 11.6 | 6.9 |
| 11 | 12.7 | 8.3 |
| 12 | 12.3 | 7.9 |
| 13 | 11.9 | 7.2 |
| 14 | 12.9 | 7.9 |
| 15 | 12.2 | 7.2 |
| 16 | 11.7 | 6.7 |
| 17 | 6.3 | 2.8 |
| 18 | 5.7 | 2.5 |
| 19 | 5.5 | 1.7 |
| 20 | 4.9 | 1.2 |
| Zircaloy-4 | 18.2 | 11.4 |

As described above, when the present zirconium alloy comprising Nb+Sn 0.35–1.0 wt % is added with Fe 0.1–0.4 wt %, Cu 0.01–0.2 wt % and Cr 0.05–0.2 wt %, the alloy can be greatly improved in corrosion resistance and mechanical properties. In addition, the alloy can obtain excellent corrosion and mechanical properties under a control of optimal annealing conditions, thus incurring economic benefit. The Nb-containing zirconium alloy nuclear fuel cladding tube prepared by the method of the present invention can be stably maintained under high burnup conditions, thereby being efficiently used as the core components in a light water and a heavy water atomic reactor type nuclear power plant.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A zirconium alloy comprising Nb 0.05–less than 0.3 wt %, Sn 0.3–0.7 wt %, Fe 0.1–0.4 wt %, Cu 0.01–0.2 wt %, Si 80–120 ppm, O 600–1400 ppm and Zr the balance.

2. The zirconium alloy according to claim 1, comprising Nb 0.2 wt %, Sn 0.5 wt %, Fe 0.2 wt %, Cu 0.1 wt %, Si 100 ppm, O 1200 ppm and Zr the balance.

3. The zirconium alloy according to claim 1, further comprising Cr 0.05–0.2 wt %.

4. The zirconium alloy according to claim 3, comprising Nb 0.2 wt %, Sn 0.5 wt %, Fe 0.3 wt %, Cr 0.15 wt %, Cu 0.1 wt %, Si 100 ppm, O 1200 ppm and Zr the balance.

* * * * *